United States Patent
Wreede et al.

[19]

[11] Patent Number: 5,497,251
[45] Date of Patent: * Mar. 5, 1996

[54] COMBINATION SPECULAR AND DIFFUSE IMAGE CHMSL

[75] Inventors: John E. Wreede, Azusa; Michael J. Virgadamo, Pasadena; Richard B. Upper, Sherman Oaks; Ronald T. Smith, Torrance, all of Calif.

[73] Assignee: Hughes Aircraft Company, Los Angeles, Calif.

[*] Notice: The portion of the term of this patent subsequent to Nov. 15, 2013, has been disclaimed.

[21] Appl. No.: 155,318

[22] Filed: Nov. 22, 1993

[51] Int. Cl.⁶ .............................. G02B 5/32; G03H 1/30
[52] U.S. Cl. .................. 359/13; 359/14; 359/22; 359/25
[58] Field of Search ........................ 359/13, 14, 19, 359/20, 22, 24, 25

[56] References Cited

U.S. PATENT DOCUMENTS

| | | | |
|---|---|---|---|
| 3,785,736 | 1/1974 | Spitz et al. | 359/20 |
| 4,677,629 | 6/1987 | Lesh | 359/20 |
| 4,807,978 | 2/1989 | Grinberg et al. | 359/20 |
| 5,106,174 | 4/1992 | Smith | 359/24 |
| 5,186,533 | 2/1993 | Hori | 359/25 |
| 5,196,951 | 3/1993 | Wreede | 359/25 |
| 5,289,298 | 2/1994 | Smith | 359/25 |
| 5,291,316 | 3/1994 | Haberman et al. | 359/25 |

Primary Examiner—Martin Lerner
Attorney, Agent, or Firm—Leonard A. Alkov; W. K. Denson-Low

[57] ABSTRACT

A hologram structure for use in a holographic center high mounted stoplight system for a vehicle. The hologram structure includes an illumination source for providing a reconstruction beam, a first array of non-overlapping hologram cells and non-hologram cells, and a second array of non-overlapping hologram and non-hologram cells. Each hologram cell of the first array produces a specular image that is viewable in a first predetermined angular field pursuant to diffraction of a portion of the reconstruction beam, and each hologram cell of the second array produces a diffuse image that is viewable in a second predetermined angular field pursuant to diffraction of a portion of the reconstruction beam. The specular images and diffuse images produced by the first and second holograms form stoplight illumination.

34 Claims, 9 Drawing Sheets

COMBINATION SPECULAR AND DIFFUSE IMAGE CHMSL

BACKGROUND OF THE INVENTION

The disclosed invention is directed generally to holograms for center high mounted stoplights for vehicles, and more particularly to a hologram that efficiently meets the required brightness and angular coverage and to an exposure technique for recording such hologram.

Present federal regulations require center high mounted stoplights (CHMSLs) in addition to the standard stoplights mounted in the rear portion of an automobile. The high mounted stoplights are intended to maximize the visibility of the automobile braking indicators to drivers following the braking vehicle, and are commonly mounted on the rear window of an automobile.

High mounted stoplights have commonly been implemented as a standard lenticular lens, a red filter, an illuminating incandescent bulb, and a reflector enclosed in a housing that is typically secured adjacent the top or bottom of an automobile rear window. However, the bulky housing partially obscures the rearward vision of the driver, and moreover imposes limitations on the design of the automobile.

Center high mounted stoplights have been also integrated into automobile body parts such as rear decks, spoilers, roofs, which to some degree substantially reduce or remove the rearward vision problem. However, such stoplights are complex and may impose limitations on the design of the automobile.

Holographic center high mounted stoplights have also been developed in order to efficiently meet the stoplight regulations. A consideration with the use of holograms for holographic center high mounted stoplights is the desire to achieve an output having a lenticulated appearance that is similar to that provided by conventional stoplights.

Another consideration with the use of holograms for holographic center high mounted stoplights is the complexity in meeting governmental luminous intensity and angular coverage requirements while utilizing a reconstruction light source of minimum power. The luminous intensity and angular coverage requirements generally include a quantitative aspect that defines luminous intensity over a defined central angular region, and a qualitative aspect that requires visibility over a horizontal angular region that is greater than the horizontal component of the defined central angular region. Essentially, the regulations require a brighter region generally in the center of the entire angular field of coverage.

SUMMARY OF THE INVENTION

It would therefore be an advantage to provide a holographic center high mounted stoplight that provides an output having an appearance that is similar to the lenticulated output of a conventional stoplight.

Another advantage would be to provide a holographic center high mounted stoplight that readily meets governmental luminous intensity and angular coverage requirements while utilizing a reconstruction light source of minimum power.

The foregoing and other advantages are provided by the invention in a holographic stoplight system that includes a light source for providing a reconstruction beam, a first array of non-overlapping hologram cells and non-hologram cells, and a second array of non-overlapping hologram and non-hologram cells. Each hologram cell of the first array produces a specular image that is viewable in a first predetermined angular field pursuant to diffraction of a portion of the reconstruction beam, and each hologram cell of the second array produces a diffuse image that is viewable in a second predetermined angular field pursuant to diffraction of a portion of the reconstruction beam. The specular images and diffuse images produced by the first and second holograms form stoplight illumination.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
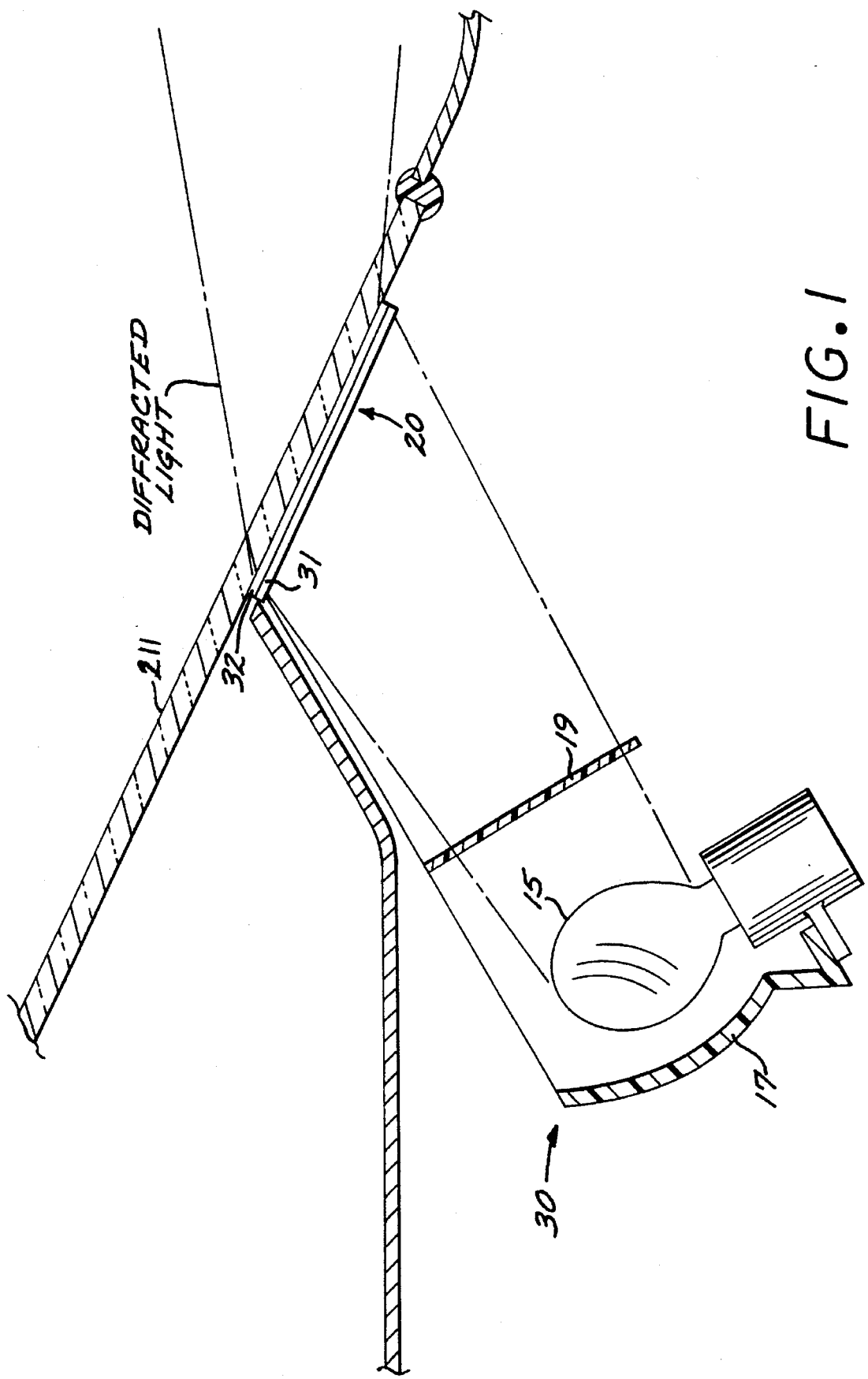
FIG. 1 sets forth a schematic sectional view illustrating a holographic vehicle center high mounted stop light in accordance with the invention.

In the following detailed description and in the several figures of the drawing, like elements are identified with like reference numerals.

Referring now to FIG. 1, shown therein is a center high mounted stoplight system which includes a hologram assembly 20 and an illumination source 30. The hologram assembly 20, which includes first and second laminarly layered volume transmission holograms 31, 32 described further herein, is secured to the inside surface of an automobile rear window 211. Alternatively, the hologram assembly 20 can be secured to a separate substrate that is appropriately located near the rear window 211. The illumination source 30 is mounted forward of the hologram assembly 20 and out of the rearward viewing angle of the driver, for example, beneath the generally horizontal rear deck that is adjacent the lower portion of the rear window 211 of the automobile, and illuminates the volume holograms 31, 32 of the hologram assembly 20 with a reconstruction beam.

The volume holograms 31, 32 of the hologram assembly are constructed to provide, when illuminated by the illumination source 30, an appropriate composite image that is visible from behind the automobile over the appropriate vertical and horizontal viewing field. Since the following will discuss the volume holograms 31, 32 in terms of their angular coverage (i.e., the angular fields in which their light output can be seen), as well as their construction, angular fields will generally be with reference to the installed configuration of the holograms, for ease of reference. As used herein, the terms angular field and angular coverage will generally refer to all angular regions in space into which light is diffracted by a hologram cell thus refer to the angular region or regions in which the diffracted light is viewable. Since the angular coverage of a hologram defines the angular fields in which the light output of a hologram can be seen, it should be appreciated that the diffracted output of a hologram is confined to its angular coverage and some additional blurring. The holograms of the hologram assembly are configured to produce diffracted illumination that is visible from behind the vehicle in which they are installed, and thus their angular fields extend rearwardly away from the vehicle.

The illumination source 30 includes an incandescent lamp 15, such as a quartz halogen bulb, a reflector 17 that cooperates with the filament of the incandescent lamp 15 to provide a reconstruction beam to the hologram assembly 20, and a high pass filter 19 having a cutoff wavelength of about 600 nanometers (nm). By way of illustrative example, the reflector 17 comprises a parabolic reflector that cooperates with the filament of the incandescent lamp 15 to produce a near collimated reconstruction beam. As a result of the wavelength dependent sensitivity of human vision, the image provided by the hologram of the hologram assembly will be perceived as red, with the apparent peak intensity being somewhere between about 610 and 620 nm. The incandescent lamp 15 is connected to the brake light actuating circuit of the automobile so as to be energized when the brake pedal is depressed.

Figure 2:
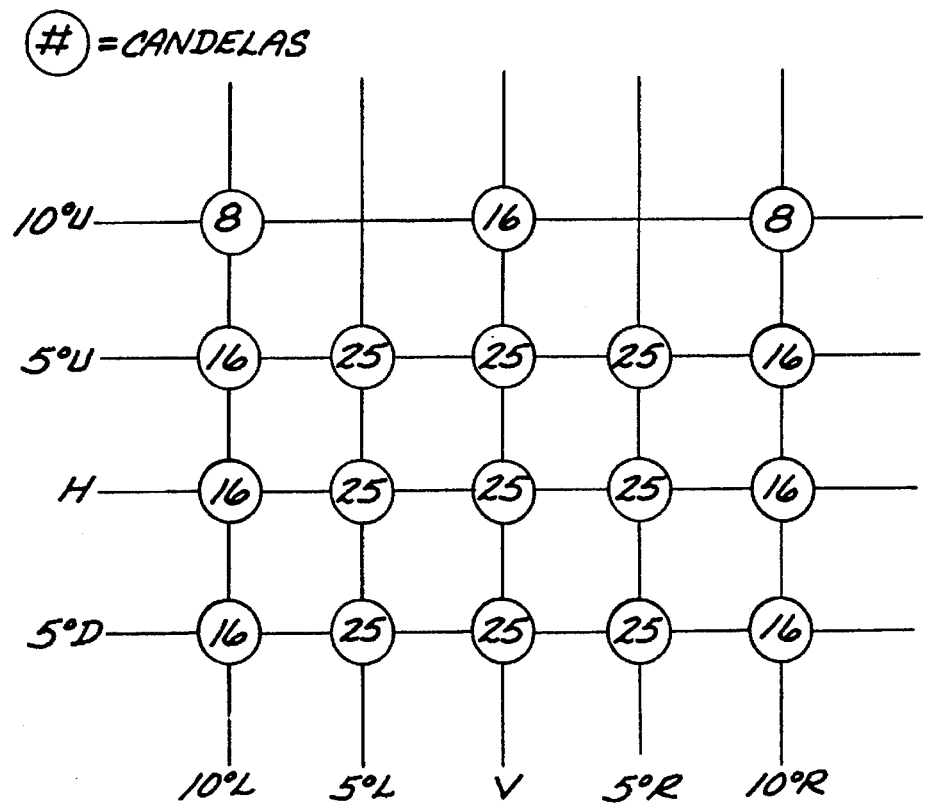
FIG. 2 sets forth a luminous intensity distribution graph depicting present vertical and horizontal requirements in candelas for center high mounted stoplights.

Referring now to FIG. 2, set forth therein is a graph showing the luminous intensity (in candelas) versus angular field requirements for a center high mounted stoplight for a central solid angular region defined as (a) 10 degrees up and 5 degrees down relative to a central horizontal plane H that passes through the center of the CHMSL, and (b) 10 degrees left and right relative to a central vertical plane V that passes through the center of the CHMSL and contains the longitudinal axis of the vehicle, as set forth in Federal Motor Vehicle Safety Standards No. 108 ("MVSS 108" herein). The numbers in the graph identify the minimum luminous intensities at those angular locations in candelas, and the entire angular field is subject to a 160 candela maximum at any given angular position.

In addition to the foregoing quantitative requirements, herein called the "central angular region requirements," there is a qualitative requirement that the stoplight be visible within the central horizontal plane over a horizontal angular field of 45 degrees on either side of the central vertical plane (i.e., two horizontal angular regions that are mirror images of each other). By way of example, this qualitative requirement can be interpreted as requiring a luminous intensity of about 1 candela. Such requirement as to visibility with the central horizontal plane over the range of 45 degrees on either side of the central vertical plane shall be called herein the wide angle horizontal requirement.

In accordance with the invention, the holograms 31, 32 are configured to diffract light into different angular fields pursuant to illumination with the reconstruction beam provided by the illumination source 30, wherein the diffracted light produced by each hologram comprises (a) bright areas and (b) dimmer or dark areas arranged in a recognizable pattern such as a logo or alphanumeric characters, for example.

Figure 3:
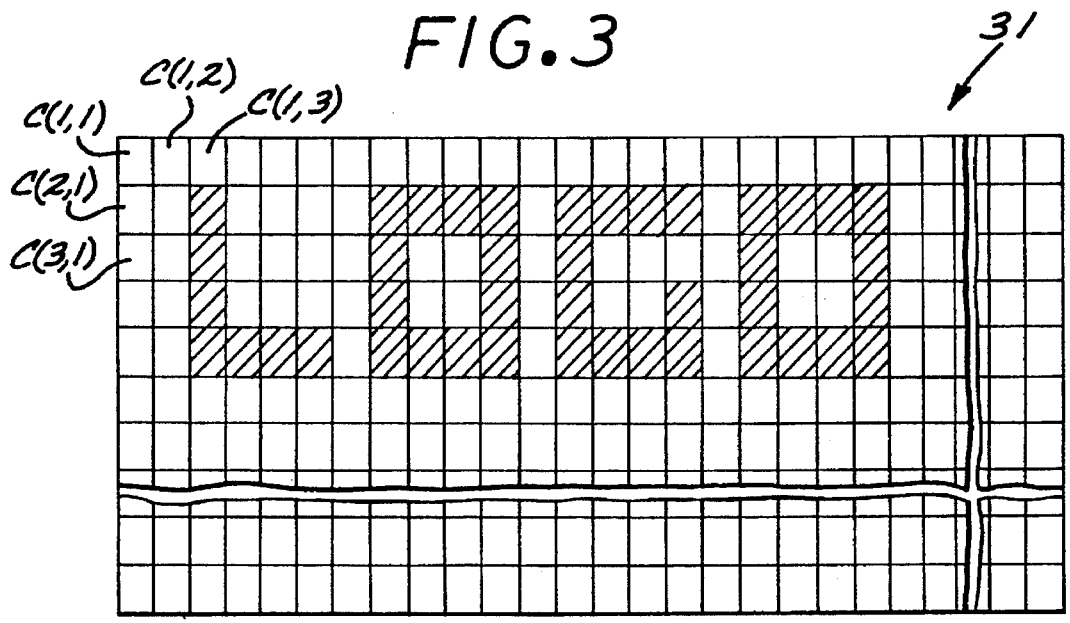
FIG. 3 schematically illustrates the organization of the cells of one of the holograms of the holographic center high mounted stop light of FIG. 1.

Referring now to FIG. 3, schematically depicted therein is the hologram 31 prior to lamination with the other hologram 32, with the surface shown being the surface that will face rearwardly when installed in a vehicle. The hologram comprises a rectilinear array or grid of non-overlapping contiguous bright hologram and dim hologram cells or facets C(i,j) of identical size. Bright hologram cells are depicted by non-shaded rectangles in FIG. 3 while dim hologram cells are depicted by shaded rectangles. By way of illustrative example, each dim hologram cell comprises a half-tone hologram comprised of an array of small hologram and non-hologram areas. Each bright hologram cell, depicted by a non-shaded rectangle in FIG. 3, produces a diffracted output having a desired angular coverage that is the same for all of the facets C(i,j) that comprise hologram cells. That is, the diffracted output of each holographic cell is viewable from within a predetermined angular space, and such angular space is substantially identical for each hologram cell of the first hologram 31.

In accordance with the invention, the bright hologram cells and dim hologram cells of the hologram of FIG. 3 are arranged in a pattern so as to produce a recognizable pattern of light and dim areas, for example a logo, when the hologram is illuminated by a reconstruction beam. The light areas are produced by the bright hologram cells, and the dim areas are produced by the dim hologram cells.

Alternatively, non-hologram cells can be substituted for the dim hologram cells of the hologram 31 of FIG. 3, in which case the bright hologram cells and non-hologram cells of the hologram of FIG. 3 are arranged in a pattern so as to produce a recognizable pattern of light and dark areas, for example a logo, when the hologram is illuminated by a reconstruction beam. The light areas are produced by the bright hologram cells, and the dark areas are produced by the non-hologram cells.

By way of reference, the top row of cells C(1,j) in the figure comprises the top of the hologram 31 as it is positioned in the installed hologram assembly of the CHMSL system, whereby each row of cells is generally aligned with the horizontal. Consistently with such orientation, the parallel edges of a cell that are generally aligned with horizontal when installed in the vehicle shall be called the top and bottom edges wherein the top edge is closest to the top of the figure and is closest to the top of the rear window when installed. Also, the parallel edges of a cell that are perpendicular to the top and bottom edges shall be referred to as the side edges. The cells C(i,j) are of identical size, and the width of a cell is measured along the top or bottom edge, while the height of a cell is measured along either of the side edges.

Figure 4:
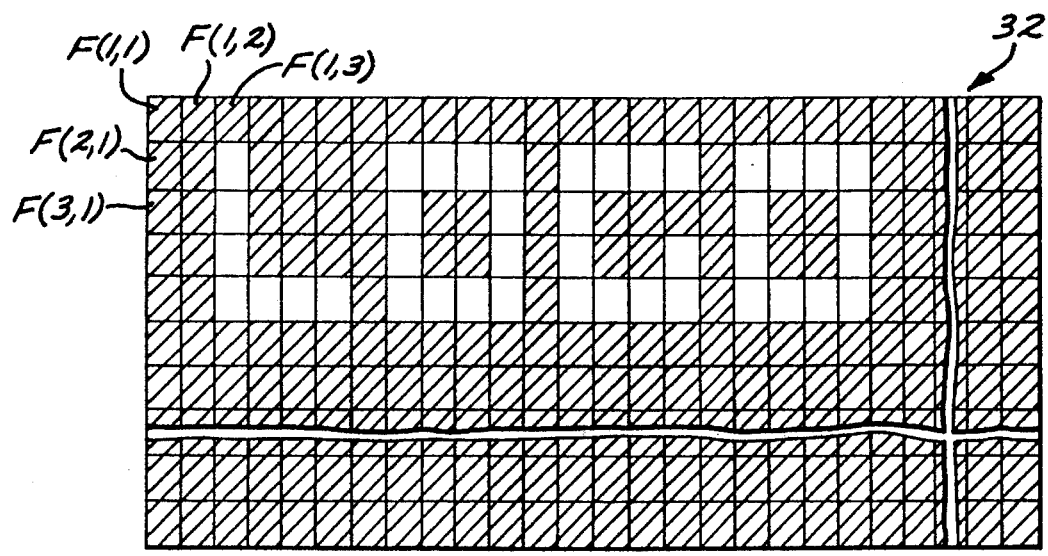
FIG. 4 schematically illustrates the organization of the cells of the other of the holograms of the holographic center high mounted stop light of FIG. 1.

Referring now to FIG. 4, schematically depicted therein is the hologram 32 prior to lamination with the other hologram 31, with the surface shown being the surface that will face outside of vehicle when installed. The hologram comprises a rectilinear array or grid of non-overlapping contiguous bright hologram and dim hologram cells or facets F(i,j) of identical size. Bright hologram cells are depicted by non-shaded rectangles in FIG. 4 while dim hologram cells are depicted by shaded rectangles. Each hologram cell, depicted by a non-shaded rectangle in FIG. 4, produces a diffracted output having a desired angular coverage that is the same for all of the facets C(i,j) that comprise hologram cells. That is, the diffracted output of each holographic cell is viewable from within a predetermined angular space, and such angular space is substantially identical for each hologram cell of the second hologram 32.

In accordance with the invention, the bright hologram cells and dim hologram cells of the hologram of FIG. 4 are arranged in a pattern so as to produce a recognizable pattern of light and dim areas, for example a logo, when the hologram is illuminated by a reconstruction beam. The light areas are produced by the bright hologram cells, and the dim areas are produced by the dim hologram cells.

Alternatively, non-hologram cells can be substituted for the dim hologram cells of the hologram 32 of FIG. 4, in which case the bright hologram cells and non-hologram cells of the hologram of FIG. 4 are arranged in a pattern so as to produce a recognizable pattern of light and dark areas, for example a logo, when the hologram is illuminated by a reconstruction beam. The light areas are produced by the bright hologram cells, and the dark areas are produced by the non-hologram cells.

By way of reference, the top row of hologram cells F(1,j) in the figure comprises the top of the hologram 32 as it is positioned in the installed hologram assembly of the CHMSL system, whereby each row of holograms cells is generally aligned with the horizontal. Consistently with such orientation, the parallel edges of a cell that are generally aligned with horizontal when installed in the vehicle shall be called the top and bottom edges wherein the top edge is closest to the top of the figure and is closest to the top of the rear window when installed. Also, the parallel edges of a cell that are perpendicular to the top and bottom edges shall be referred to as the side edges. The cells F(i,j) are of identical size, and the width of a cell is measured along the top or bottom edge, while the height of a cell is measured along either of the side edges.

By way of illustrative example, the respective bright hologram and dim hologram (or non-hologram) patterns of the first and second holograms can be the negative of each other wherein the light areas and dim (or dark) areas in one hologram are respectively dim (or dark) areas and light areas in the other hologram. For example, a logo formed by the dim (or dark) areas in one hologram can be formed by bright areas in the other hologram.

In accordance with the invention, each of the hologram facets or cells of one of the holograms 31, 32 is configured to diffract light into an angular field that comprises the central solid angular region depicted in FIG. 2, namely a solid angle having upper and lower limits of 10 degrees up and 5 degrees down relative to horizontal, and lateral limits of 10 degrees on either side of a vertical plane that is parallel to the longitudinal axis of the vehicle. In other words, the solid angular region is centered on a line that passes through the center of a hologram cell, is about 2.5 degrees above horizontal, and is in a vertical plane that is parallel to the longitudinal axis of the vehicle. Each of the hologram cells of the other hologram is configured to diffract light into an angular field that is comprised of two horizontal regions on either side of the central solid angular region such that the combination of both holograms meets the horizontal wide angle requirement. Such two horizontal regions shall sometimes be called the peripheral horizontal angular regions.

It should be appreciated that while hologram angular coverage is discussed in terms of precise angles, the actual coverage will typically slightly exceed the constructed angular coverage due to blurring caused by a non-ideal reconstruction beam. Thus, to the extent that two hologram cells are constructed to have respective non-overlapping angular coverages that are contiguous without a gap in coverage, in practice there will be overlap in coverage due to blurring.

For ease of reference, the hologram that diffracts light into the central solid angular region shall sometimes be called the narrow angle hologram while the other hologram shall sometimes be called the wide angle hologram.

In accordance with the invention, each of the cells of one of the holograms 31, 32 a produces specular image while the each of the cells of other hologram produces a diffuse image. For example, for an implementation wherein the narrow angle hologram produces specular images, each of the hologram cells of the narrow angle hologram produces an image of a masked point source, while each of the cells of the wide angle hologram produces diffuse image. Conversely, the wide angle hologram can be configured to produce specular images, in which case the narrow angle hologram would be configured to produce diffuse images. The hologram cells of the first hologram 31 diffract light into respective substantially identical predetermined angular fields, and the cells of the second hologram 32 diffract light into respective substantially identical predetermined angular fields that are different from the predetermined angular fields of the hologram cells of the hologram 31.

The number of cells in each of the holograms 31, 32 and the arrangement of cells in each of the holograms will depend on the overall shape and size of the entire format of each hologram and the selected cell size, wherein cell size is selected pursuant to consideration of factors such as appearance, the nature of the pattern of bright and dim (or dark) areas, and ease of production. As discussed further herein, the invention contemplates that as to the hologram cells that produce specular images, the ratio of cell width to foreshortened cell height is selected to satisfy the requirements of MVSS 108. Further considerations for the dimensions of the hologram cells include sizing the cells to match the particular automobile design, as well as sizing the cells to achieve appropriate resolution of the recognizable pattern of bright and dim (or dark) areas.

For the illustrative example wherein the first hologram 31 comprises a wide angle hologram that produces diffuse images and the second hologram 32 comprises a narrow angle hologram that produces specular images, each hologram cell F of the second hologram 32 is constructed such that upon reconstruction each hologram cell F produces the image of a masked point source that emits a diverging light beam into an angular field comprising a solid angular region having upper and lower limits of 10 degrees up and 5 degrees down relative to horizontal, and lateral limits of 10 degrees on either side of a vertical plane that is parallel to the longitudinal axis of the vehicle. Further for such illustrative example, each hologram cell C of the first hologram 31 produces the image of a diffuser that emits diffuse light into an angular field comprised of two peripheral angular regions on either side of the central solid angular region. For example, both peripheral solid angular regions have upper and lower limits of about 5 degrees up and about 5 degrees down relative to horizontal. One peripheral angular region is between 10 degrees and 45 degrees on one side of a vertical plane that is parallel to the longitudinal axis of the vehicle, while the other angular region is between 10 degrees and 45 degrees on the other side of a vertical plane.

For another illustrative example wherein the first hologram 31 comprises a wide angle hologram that produces specular images and the second hologram 32 comprises a narrow angle hologram that produces diffuse images, each hologram cell F of the second hologram 32 is constructed such that upon reconstruction each hologram cell F emits light into the central angular region, while each hologram cell C of the first hologram 31 is constructed such that upon reconstruction each cell produces the image of a masked line source that emits a diverging light beam into the two peripheral regions on either side of the central region.

By way of illustrative examples, the specular hologram cells are configured such that the point and line source images produced are in front of the hologram assembly (toward the front of the vehicle) or behind the hologram assembly (toward a viewer behind the vehicle).

The solid angular fields into which the specular hologram cells diffract light are controlled by the dimensions of the hologram cell and the distance of the point or line source image from the corresponding hologram cell. Since the central solid angular region requirement of MVSS 108 specifies a vertical angular spread, for a narrow angle specular hologram cell the ratio of foreshortened cell height to cell width is selected to correspond to the ratio of vertical angular spread to horizontal angular spread of the central solid angular region, and the distance of the point source is selected to meet the specific central vertical and horizontal angular spread requirements.

For a specular wide angle hologram cell, the cell width and the distance of the line source from the cell are selected to meet the specific horizontal angular spread of the horizontal wide angle requirement of MVSS 108, and some vertical angular spread is provided by a less than ideal reconstruction source. Alternatively, the vertical angular spread of the line source image can be controlled by introducing slight power in the vertical direction.

Figure 5A:
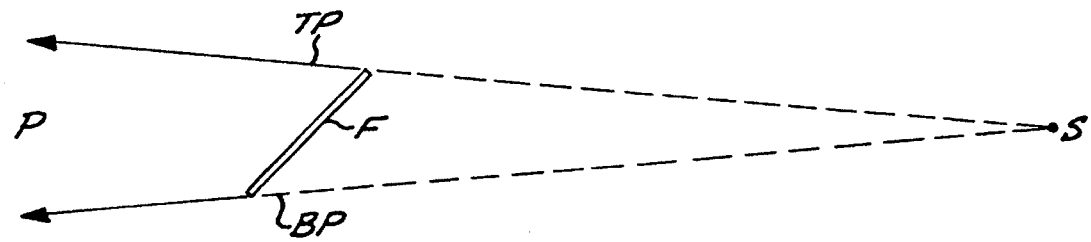
FIGS. 5A and 5B schematically illustrate the playback characteristics of each of the hologram cells of the hologram of FIG. 3 in elevational view and in plan view.
Figure 5B:
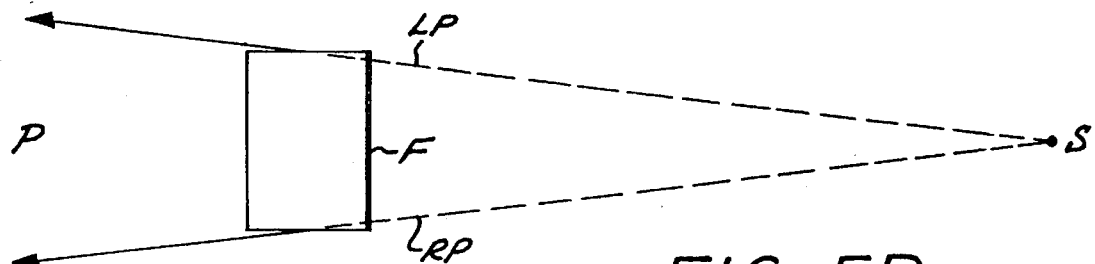

Referring in particular to FIGS. 5A and 5B, schematically set forth therein are an elevational side view and a top plan view of a specular narrow angle hologram cell F, for the example wherein the second hologram 32 comprises a narrow angle specular hologram, as oriented in an installed hologram assembly together with the diffracted light output beam P produced thereby. As shown in FIG. 5A, the upper and lower boundaries of the output beam P are determined by (1) a top plane TP defined by an apparent point source S and the top edge of the hologram cell and (2) a bottom plane BP defined by the apparent point source and the lower edge of the hologram cell. The top plane TP and the bottom plane BP are depicted by lines in FIG. 5A since such planes are orthogonal to the plane of the figure. The portions of the planes TP and BP shown by solid lines depict the playback beam limits while the portions of the such planes shown by broken lines represent the top and bottom limits of the virtual beam emanating from the apparent point source S. As shown in FIG. 5B, the lateral boundaries of the output beam P are determined by (1) a left side plane LP defined by the apparent point source S and the left edge of the hologram cell and (2) a right side plane defined by the apparent point source S and the right edge of the hologram cell. The left side plane LP and the right side plane RP are depicted by lines in FIG. 5B since such planes are orthogonal to the plane of the figure. As with the FIG. 5A, the portions of the planes LP and RP shown by solid lines represent the lateral limits of the playback beam while the portions of the planes LP and RP shown by broken lines depict the lateral limits of the virtual beam emanating from the apparent point source S.

From FIGS. 5A and 5B, it should be appreciated that, assuming the apparent point source S is centered laterally between the sides of a specular narrow angle hologram cell F, the angular coverage of the output beam P and the orientation of such angular coverage relative to the hologram cell depends on the location of the apparent point source S and the ratio of (a) the width of the hologram cell and (b) the subtended hologram cell height (i.e., the height of the hologram cell as projected onto a plane orthogonal to the center axis of the angular coverage), which are controlled by the construction of the hologram cell. In particular, each hologram cell F is exposed with a diverging object beam that emanates from a focus point and is masked at the hologram recording layer. The location of the object beam focus point, which defines the location of the apparent source S, and the ratio of the hologram cell width to the subtended height are selected to provide the desired angular coverage for the hologram cell.

Figure 6A:
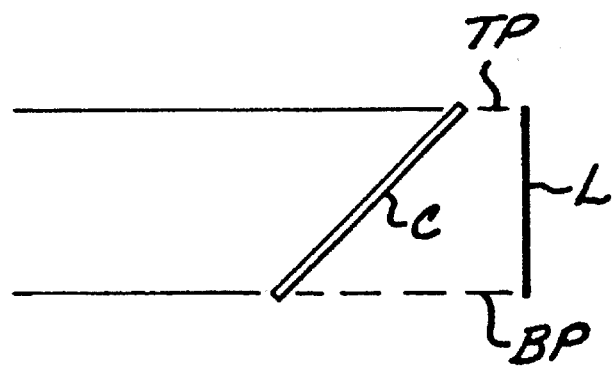
FIGS. 6A and 6B schematically illustrate the playback characteristics of each of the hologram cells of the hologram of FIG. 4 in elevational view and in plan view.
Figure 6B:
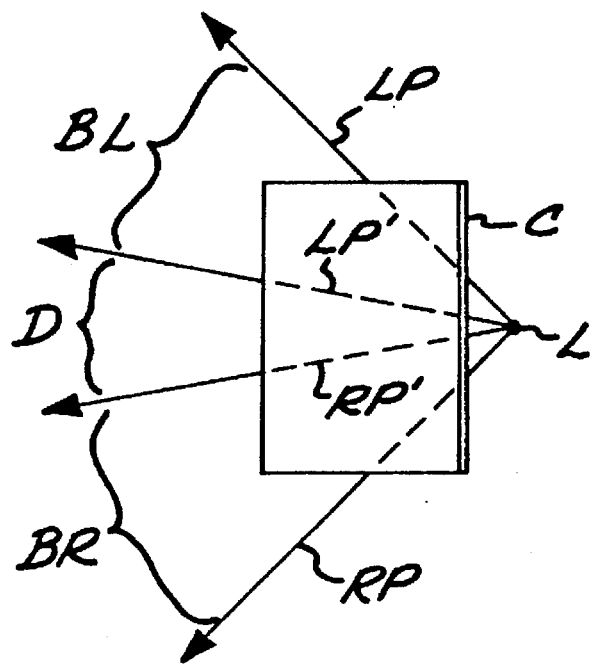

For the particular example wherein the first hologram 31 comprises a wide angle hologram that produces specular images, set forth in FIGS. 6A and 6B are an elevational side view and a top plan view of a wide angle specular hologram cell C of the hologram 31, as oriented in an installed hologram assembly together with the diffracted beams BL, BR produced thereby. As shown in FIG. 6A, the upper and lower boundaries of the left and right output beams BL, BR of a wide angle hologram are determined by (1) a top horizontal plane TP that contains the top edge of the hologram cell and (2) a bottom plane BP that contains the lower edge of the hologram cell. The top plane TP and the bottom plane BP are depicted by lines in FIG. 6A since such planes are orthogonal to the plane of the figure. The portions of the planes TP and BP shown by solid lines depict the playback beam limits while the portions of the such planes shown by broken lines represent the top and bottom limits of the virtual beam emanating from the apparent line source L. The lateral boundaries of the left output beam BL is determined by (1) a left side plane LP defined by the apparent line source L and the left edge of the cell and (2) a plane LP' that is 10 degrees left of a vertical plane that passes through the center of the cell. The lateral boundaries of the right output beam BR are determined by (1) a right side plane RP defined by the apparent line source L and the right edge of the cell and (2) a plane RP' that is 10 degrees to the right of a vertical plane that passes through the center of the cell. The planes LP, LP', RP, RP' are depicted by lines in FIG. 6B since such planes are orthogonal to the plane of the figure. As in FIG. 6A, the portions of the planes LP, LP', RP, RP' shown by solid lines represent the lateral limits of the diffracted beams while the portions of the such planes shown by broken lines depict the lateral limits of the virtual beams emanating from the apparent line source L. As described further herein, the planes LP, LP', RP, RP' are defined by appropriate masking of the object beam utilized to construct a specular wide angle hologram cell C.

The angular coverage of a diffuse narrow angle hologram cell is substantially the same as shown in FIGS. 5A and 5B for a specular narrow angle hologram, except that the image produced would be diffuse. The angular cover of a diffuse wide angle hologram cell is substantially the same as shown in FIGS. 6A and 6B for a specular side angle hologram, except that the image produced would be diffuse.

As to the the particular example wherein the first hologram 31 is closest to the reconstruction source 30 and comprises the wide angle hologram, the wide angle hologram would have to be relatively inefficient to allow most of the reconstruction illumination to pass through to the narrow angle hologram which needs to provide a considerably brighter output. For example, the wide angle hologram could have an efficiency of about 30–40% for ideal reconstruction illumination while the narrow angle hologram could have an efficiency of at least 90% for ideal reconstruction illumination.

To the extent that the wide angle hologram is implemented with relatively high efficiency, the second hologram 32 should be implemented as the wide angle hologram and the first hologram should be implemented as the narrow angle hologram, and both holograms should have relatively high efficiencies of at least 90% for ideal reconstruction illumination. These conditions follow from the requirement that the diffracted light output of the narrow angle hologram must be considerably greater than the diffracted light output of the wide angle hologram. By making the narrow angle hologram relatively efficient and locating it closest to the reconstruction source, the narrow angle hologram can meet the luminous intensity requirements by diffracting most of the reconstruction illumination. Since most of the reconstruction illumination is diffracted by the narrow angle hologram, the reconstruction illumination available to the wide angle hologram is reduced considerably and it also must have a relatively high efficiency of at least 90% for ideal reconstruction illumination.

It should be pointed out that as to both of the foregoing implementations as to the sequence of the narrow angle and wide angle holograms, loss due to re-diffraction should be considered for implementations wherein wide angle hologram cells and narrow angle hologram cells are superimposed.

In the implementation wherein wide angle hologram cells and narrow angle hologram cells are superimposed, and wherein the wide angle hologram is closest to the reconstruction illumination source, only a small amount of diffracted light within the central solid angular region would be incident on the narrow angle hologram as result of the limited overlap in the angular coverages of the narrow angle and wide angle holograms and also the relatively low efficiency of the wide angle hologram for such implementation. Accordingly, only a small amount of diffracted light would be re-diffracted by the narrow angle hologram.

In the implementation wherein narrow angle hologram cells and wide angle hologram cells are superimposed, and wherein the narrow angle hologram is closest to the reconstruction illumination source, a large amount of diffracted light within the narrow angle central region defined by MVSS 108 will be incident on the wide angle hologram. However, since the wide angle hologram is constructed to reduce the amount of light it diffracts into the central angular region, the amount of re-diffraction of the light diffracted by the narrow angle hologram is reduced.

In an implementation wherein each hologram comprises an array of bright and dim hologram cells, and the bright hologram cell and dim hologram cell pattern of one hologram is the negative of the bright hologram cell and dim hologram cell pattern of the other hologram, there will be a reduced amount of re-diffraction. In an implementation wherein each hologram comprises an array of hologram cells and non-hologram cells, and the hologram cell and non-hologram cell pattern of one hologram is the negative of the hologram cell and non-hologram cell pattern of the other hologram, there will be no re-diffraction.

Each of the first and second holograms 31, 32 is made from an appropriate holographic recording layer in which the areas selected for dim holograms are subjected to half-tone pre-exposure with incoherent light so that the output of the hologram cells to be formed therein will be less bright than the output the holograms that are to be formed in the areas in which bright holograms cells are to be formed. For example, a film type mask that is opaque except for half-tone areas that define the dim hologram cells is placed adjacent the holographic recording layer and index matched thereto by a thin layer of index matching fluid. In accordance with conventional techniques, the half-tone areas of the mask are areas each of which includes a pattern of many very small opaque and transparent subareas. The mask is then illuminated with incoherent light such that the areas of the hologram recording layer adjacent the transparent subareas of the half-tone areas are desensitized so that holograms cannot form therein. In other words, the areas of the hologram recording layer that are adjacent the half-tone areas of the mask are desensitized in a half-tone manner, such that as to the areas of the hologram layer in which dim hologram cells are to be formed, only the areas protected by the very small opaque subareas of the mask half-tone areas will contain holograms. The end result is that in a dim hologram cell, holograms are formed in a portion of the cell, where such portion is comprised of very small subareas.

To the extent that each of the holograms 31, 32 comprises an array of hologram and non-hologram cells, the non-hologram cells are formed by exposing areas thereof that are to contain the non-hologram cells to incoherent light. For example, a film type mask that is opaque except for transparent areas that define the non-hologram cells is placed adjacent the holographic recording layer and index matched thereto by a thin layer of index matching fluid. The mask is then illuminated with incoherent light such that the areas of the hologram recording layer uncovered by the mask are desensitized so that holograms cannot be formed therein.

After appropriate desensitizing to define dim hologram cells or non-hologram cells, the hologram cells (bright and dim, or bright only, depending upon implementation) are formed by hologram forming exposure. All hologram cells in a hologram can be exposed to diffract identically, or they can be exposed to have different diffraction characteristics, depending upon the specific requirements such as the curvature of the installed hologram assembly or non-collimination of the illumination source. Further, the hologram cells in a hologram can be exposed one cell at a time or several hologram cells at a time.

Figure 7:
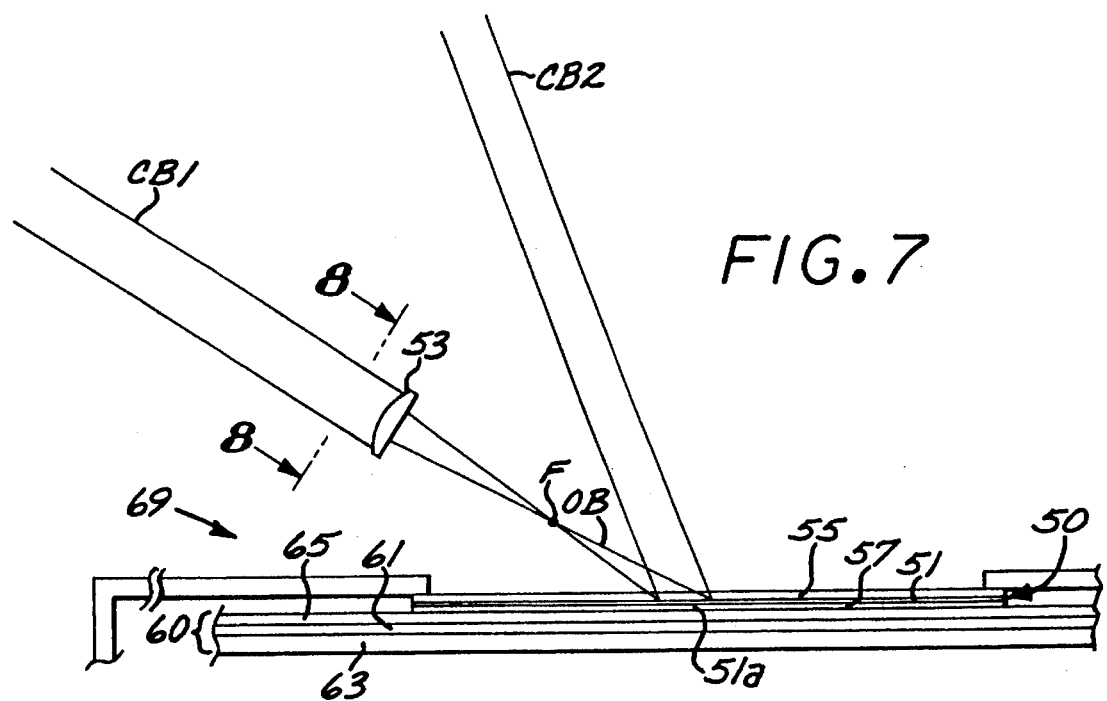
FIG. 7 sets forth by way of illustrative example an exposure system for constructing a narrow angle hologram in accordance with the invention that produces specular images.

Referring now to FIG. 7, set forth therein by way of illustrative is an exposure set up for recording the specular hologram cells of a narrow angle specular hologram by a sequence of exposures wherein each exposure is capable of exposing a plurality of non-contiguous cells in a row. The exposure set up includes a horizontal linear array 53 of plano-convex spherical lenses 53a, schematically depicted in FIG. 8 as viewed along a collimated beam CB1. The plano-convex spherical lenses have their curved surfaces toward the collimated beam CB1, as depicted in FIG. 7, and have a horizontal center-to-center spacing S1 that is determined by the size required for each of the plano-convex spherical lenses 53a to produce the desired vertical and horizontal angular spread of the object beams for the hologram cells of the narrow angle hologram. Further, the center-to-center spacing S1 is equal to the center-to-center spacing of an integral number of adjacent cells. The exposure set up further employs a film type mask 51, as schematically depicted in FIG. 4, that is opaque except for uniformly spaced transparent areas 51a that are of the same size as each of the cells of the CHMSL holograms 31, 32 and are aligned with the plano-convex spherical lenses 53a so as to have the same center-to-center spacing S1 as the plano-convex lenses 53a. The number of transparent areas 51a is the same as the number of plano-convex lenses 53a.

As more particularly shown in FIG. 7, a holographic recording assembly 60 is disposed beneath an exposure mask assembly 50. The holographic recording assembly 60 is comprised of a glass substrate 63, a holographic recording layer 61 disposed on the glass substrate 63, and a thin cover layer 65 disposed over the holographic recording layer 61.

In accordance with conventional techniques, a light absorbing layer would be positioned adjacent the bottom of the glass substrate 63 and index matched thereto by a layer of index matching fluid. The exposure mask assembly 50 is comprised of the mask 51 and a mask supporting substrate 55. The hologram recording assembly 60 and the exposure mask assembly 50 are oriented with the exposure mask 51 and the thin cover layer 65 facing each other and separated by a very thin layer of index matching fluid 57.

By way of illustrative example, the holographic recording assembly 60 is movable, for example by a computer driven motor, such that areas that correspond to the cells of the CHMSL hologram can be selectively positioned beneath the mask transparent areas 51a. In order to limit illumination to the cells uncovered by the mask transparent areas, the mask and the mask substrate are secured in the opening of an opaque top cover of a conventional oil gate trough 69, wherein the top cover is sufficiently large to ensure that only the portions of the hologram recording layer beneath the mask transparent areas 51a will be exposed to construction illumination for all exposure positions of the hologram recording layer.

The object beams OB are produced by portions of a collimated beam CB1 which pass through the spherical lenses 53, converge down to respective focus points F, and then diverge to provide diverging object beams OB for the hologram forming cells of the hologram recording layer uncovered by the mask transparent areas 51a. Based on the geometrical considerations discussed above relative to FIGS. 6A and 6B, the size of the hologram forming cells and the position of the spherical lens array relative to the mask transparent areas is selected so as to produce the desired angular coverage in the vertical and horizontal directions for the resulting hologram cells, taking into account foreshortening caused by the tilt of the installed hologram.

The reference beams for exposure comprise portions of a collimated beam CB2, whose angle is based on an illustrative example of a CHMSL that is illuminated from below as illustrated in FIG. 1. The top of the CHMSL hologram corresponds to the left edge of the hologram recording layer that is perpendicular to the plane of the figure.

Exposure of cells uncovered by the mask transparent areas 51a is accomplished by positioning the hologram recording assembly to locate the areas of the hologram recording layer corresponding to the cells beneath the mask transparent areas and illuminating the unmasked cells with construction illumination via the plano-spherical lens array and the collimated beam CB2. For the particular implementation wherein the hologram comprises an array of bright hologram cells and dim hologram cells, holograms are formed across the entire format of the areas intended to be bright hologram cells, and in the very small half-tone subareas of the areas intended to be dim hologram cells. For the implementation wherein the hologram comprises an array of bright hologram cells and non-hologram cells, holograms can be formed only in the areas of the hologram recording layer that are intended to be hologram cells, since the areas of the intended non-hologram cells were desensitized by desensitizing exposure with incoherent illumination.

By way of illustrative example, the cell rows are exposed in sequence, and within each row cell, subsets of the set of cells that ultimately form the row can be subjected to construction illumination in a sequence. Thus, for the particular example wherein the spacing between mask transparent areas is three cells, for each row i the hologram recording assembly would be moved to uncover a first cell subset comprised of the cells C(i,j) wherein j is equal to 1, 4, 7, 10, etc. After the hologram recording assembly has settled, such first cell subset would be exposed with construction illumination. The hologram recording assembly would then be moved to uncover a second cell subset comprised of the cells C(i,j) wherein j is 2, 5, 8, 11, etc. After the hologram recording assembly has settled, such second cell subset would be exposed with construction illumination. The procedure of indexing the hologram recording assembly by one cell along a row, and exposing the uncovered cells with construction illumination would be repeated as required to subject all of the cells in a given row to hologram construction illumination. Although all cell areas in a given row are illuminated with hologram construction illumination, holograms can form only in those areas that have not been desensitized. Depending upon the number of cells in a row, the number of transparent areas in the mask, and the spacing between mask transparent areas, it should be appreciated that in one or more of the later indexed positions in a row, the number of cells uncovered can be less than the number of cells uncovered in the first indexed position.

In the foregoing procedure wherein the hologram recording layer is moved relative to the mask, the object beam forming lenses are stationary, and the reference beams comprise collimated beams, each cell is exposed with substantially the same reference beam incidence angle where such reference beam angle is formed between the plane of the cell and a line that passes through the center of the cell and is parallel to the central axis of the collimated beam CB2. To the extent that a non-collimated reference beam shape is utilized, the reference beam angle would be the same for all cells but the playback beam angle for a corresponding non-collimated playback beam shape will not be the same for all cells, which will result in reduced brightness if constructed with respective reference beams having substantially the same incidence angle. In order to more accurately emulate the playback source, the reference beam incidence angle can be changed for each row of cells such that the reference beam incidence angle for each cell more closely approximates the playback incidence angle intended for that cell, for example as disclosed in commonly assigned copending application U.S. Ser. No. 07/995,117, filed Dec. 22, 1992, by Smith et al., entitled "MODIFIED TECHNIQUE FOR FABRICATING LOW NOISE FLOODLIT CHMSL HOLOGRAMS", now U.S. Pat. No. 5,387,989, incorporated, herein by reference.

Figure 10:
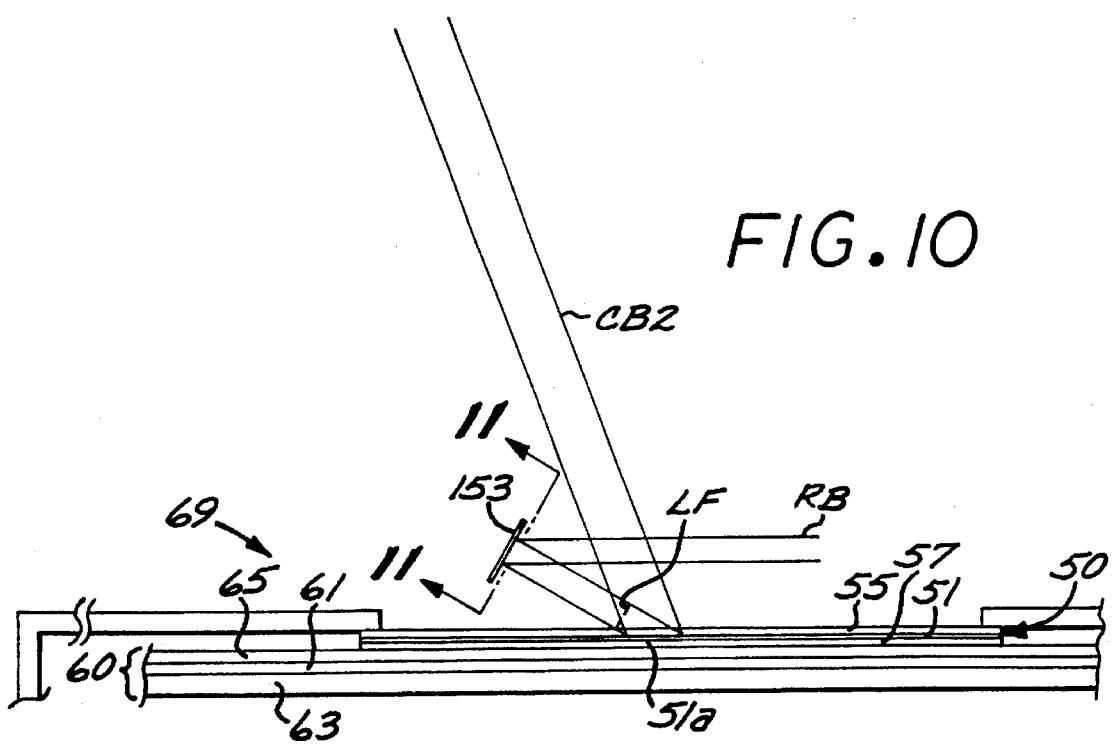
FIG. 10 sets forth by way of illustrative example an exposure system for constructing a wide angle hologram in accordance with the invention that produces specular images.
Figure 11:
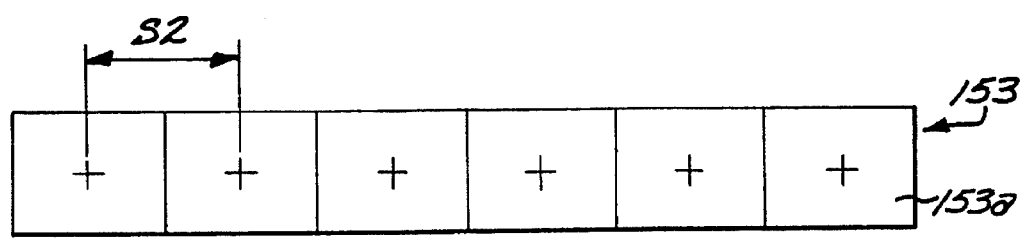
FIG. 11 sets forth by way of illustrative example a schematic illustration of a holographic optical element array that is utilized in the exposure system of FIG. 10.
Figure 12:
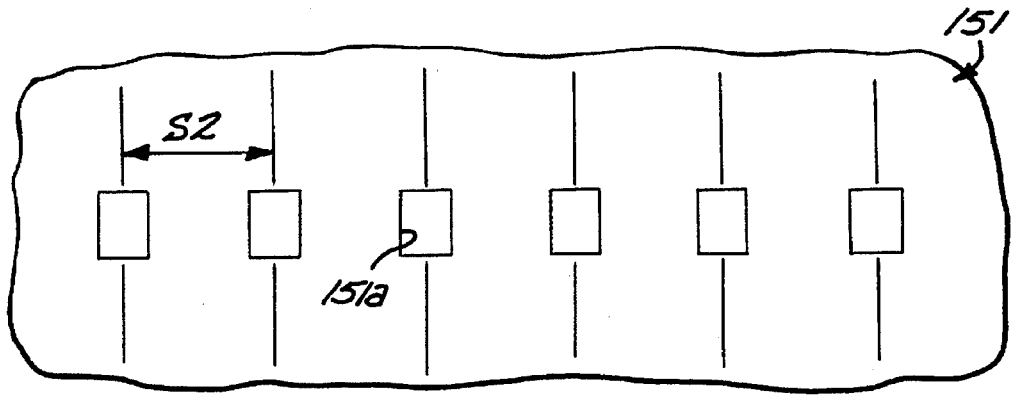
FIG. 12 sets forth by way of illustrative example a schematic illustration of a mask that is utilized to define hologram cells in the exposure system of FIG. 10.
Figure 13:
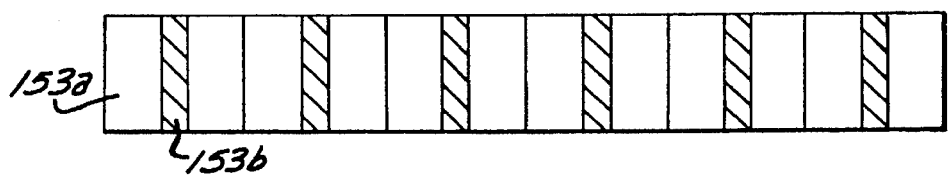
FIG. 13 sets forth by way of illustrative example a schematic illustration of a masked holographic optical element array for use in the exposure system of FIG. 10.

Referring now to FIG. 10, set forth therein by way of illustrative example is an exposure set up for recording the specular hologram cells of a wide angle specular hologram by a sequence of exposures wherein each exposure exposes a plurality of uniformly spaced non-contiguous cells in a row. The exposure system of FIG. 10 is similar to the exposure system of FIG. 7, and like elements therein are designated with like reference numerals. The differences in the exposure system include a linear array 153 of holographic optical elements 153a that are reconstructed by a collimated reconstruction beam RB, and a film type mask 151 that is opaque except for transparent areas 151a as shown in FIG. 12. The reconstruction beam incident surfaces of the holographic optical elements are shown in FIG. 11. Each of the holographic optical elements 153a comprises a simple cylinder lens (i.e., its output emulates the output of a refractive cylindrical lens), for example, whose cylinder axis is parallel to the plane of FIG. 10. The output of each holographic optical element 153a comprises a beam that converges to a line focus L which is parallel to the plane of the figure, and then diverges, such that the light incident on the hologram recording layer is diverging along an axis that is perpendicular to the plane of the figure. The holographic optical elements are positioned sufficiently close to the mask transparent areas 151a to achieve the horizontal angular spread required of the wide angle hologram. The holographic optical elements 153a and the mask transparent areas 151a are aligned with each other with a horizontal center-to-center spacing S2 that is determined by the amount of spacing required for each of the holographic optical elements 153a to produce the desired vertical and horizontal angular spread at areas uncovered by the mask transparent areas without intersection of the beams at the hologram areas uncovered by the mask transparent areas. In other words, the holographic optical elements 153a must be separated from each other such that their outputs do not overlap at the hologram areas uncovered by the mask transparent areas 151a. Further, the center-to-center spacing S2 is equal to the center-to-center spacing of an integral number of adjacent hologram cells. As shown in FIG. 13, in order to limit the diffraction of the wide angle hologram to the peripheral horizontal regions, masks 153b are disposed on the holographic optical elements 153a such that object beam illumination is limited to a selected angular region. Each mask 153b extends the vertical extent of the holographic optical element to which it is attached and has a lateral extent that is selected so as to block object beam illumination from a desired angular region, for example the central angular region that extends horizontally 10 degrees on either side of center as defined by MVSS 108. In this manner, the amount of light diffracted by the wide angle hologram into the central solid angular region is reduced, and thus the wide angle hologram has little angular overlap with the narrow angle hologram.

By way of illustrative example, the cell rows of peripheral horizontal region hologram made pursuant to the exposure set up of FIG. 10 are exposed in an indexed manner as described above with respect to the exposure set up of FIG. 7.

Further in accordance with the invention, each of the holographic cells of the wide angle hologram can be configured to produce a beam that provides the appropriate horizontal angular spread in the installed horizontal direction, as well as a few degrees angular spread in the vertical direction, for example by being constructed with an object beam that comprises the output of a cylindrical lens that is illuminated with a converging beam. This results in a holographic optical element that emulates a cylindrical lens with a slight amount of spherical power.

Figure 8:
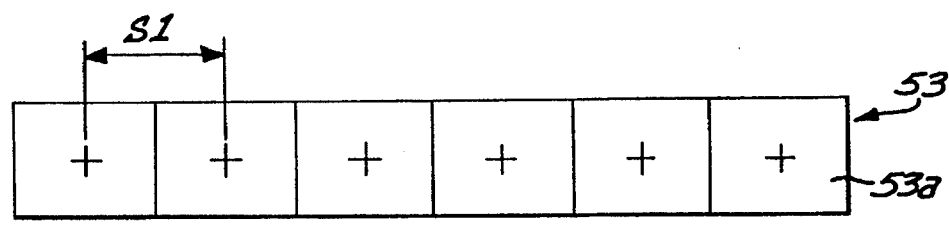
FIG. 8 sets forth by way of illustrative example a schematic illustration of a spherical lens array that is utilized in the exposure system of FIG. 7.
Figure 9:
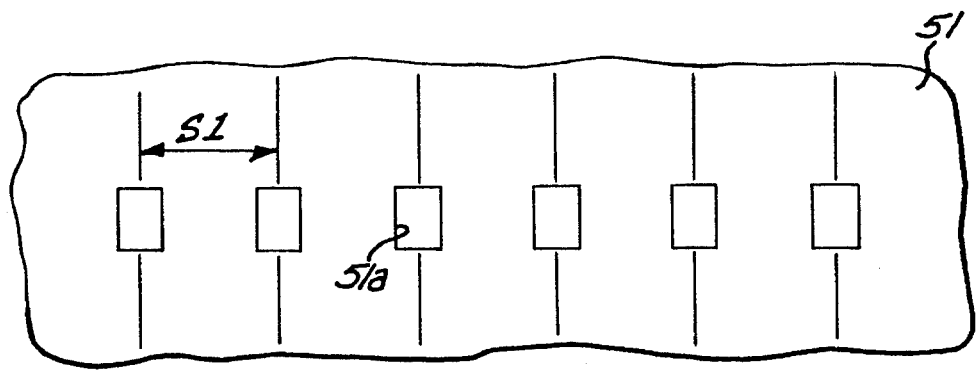
FIG. 9 sets forth by way of illustrative example a schematic illustration of a mask that is utilized to define hologram cells in the exposure system of FIG. 7.

It should be appreciated that a wide angle specular hologram of the invention can be constructed using a linear array of cylindrical lenses substituted for the holographic optical elements of the exposure set up of FIG. 8, together with suitable masks disposed thereon to limit the object beam illumination in the region that corresponds to the central angular region.

Figure 14:
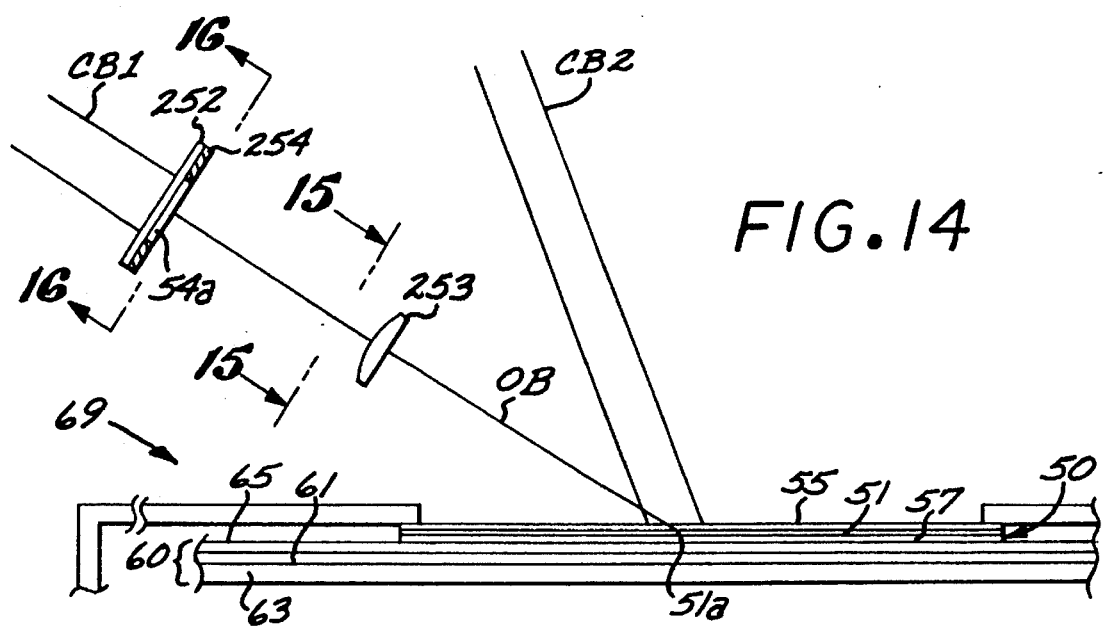
FIG. 14 sets forth by way of illustrative example an exposure system for constructing a narrow angle hologram in accordance with the invention that produces diffuse images.
Figure 15:
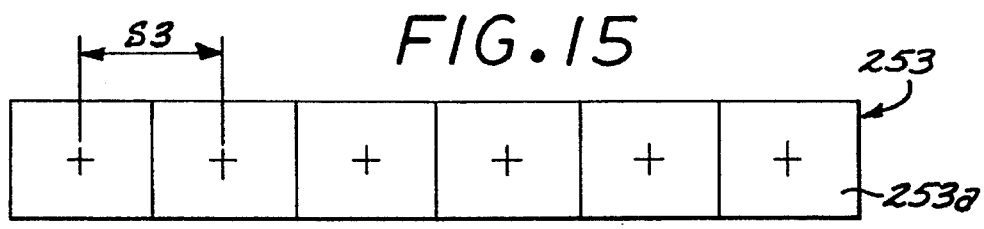
FIG. 15 sets forth by way of illustrative example a schematic illustration of a spherical lens array that is utilized in the exposure set up of FIG. 14.
Figure 16:
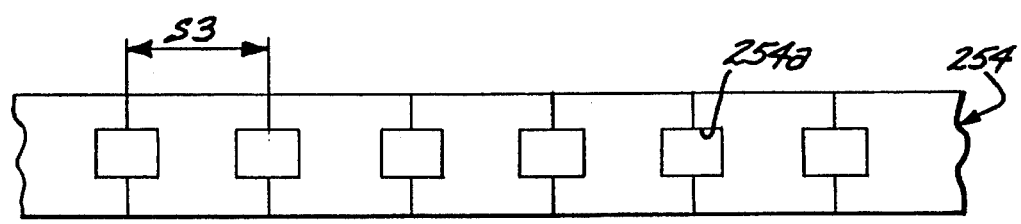
FIG. 16 sets forth by way of illustrative example a schematic illustration of a mask that is utilized to mask the output of a diffusion screen in the exposure set up of FIG. 14.

Referring now to FIG. 14, set forth therein by way of illustrative is an exposure set up for recording the diffuse narrow angle hologram cells of a diffuse narrow angle hologram by a sequence of exposures wherein each exposure is capable of exposing a plurality of non-contiguous hologram cells in a row. The exposure set up includes a horizontal linear array 253 of plano-convex spherical lenses 253a which receives the masked output of a diffusion screen 252 that is illuminated with a collimated beam CB1. The diffusion screen 252 is displaced from the plano-convex spherical lenses 253a by the focal length of such lenses, which are schematically depicted in FIG. 15 as viewed from the output side of the diffusion screen 252. The output of the diffusion screen 252 is masked by a film type mask 254 that is opaque except for a horizontal linear array of transparent areas 254a as schematically depicted in FIG. 16, as viewed from the output side of the mask 254. The curved surfaces of the plano-convex spherical lenses 253 are toward the diffusion screen, as shown in FIG. 14. The mask transparent areas 254a are aligned with the spherical lenses 253a so as to have the same center to center spacing S3, which is equal to an integral number of adjacent cells to be formed in the holographic recording layer being exposed. For ease of illustration, the masked outputs of the diffusion screen 252 and the outputs of the plano-convex spherical lenses 253a are represented by centerlines.

Figure 17:
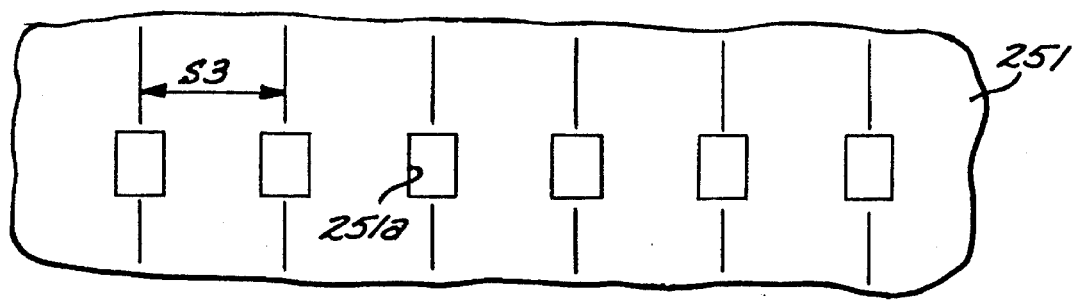
FIG. 17 sets forth by way of illustrative example a schematic illustration of a mask that is utilized to define the areas of hologram cells in the exposure set up of FIG. 14.

The exposure set up further employs a film type mask 251, as schematically depicted in FIG. 17, that it is opaque except for uniformly spaced transparent areas 251a of the same size as each of the cells of the CHMSL holograms 31, 32 and aligned with the plano-convex spherical lenses 253a so as to have the same center-to-center spacing S3 as the plano-convex lenses 253a. The number of transparent areas is the same as the number of plano-convex lenses 253a. The horizontal center-to-center spacing S3 of the plano-convex spherical lenses 253a, the mask transparent areas 254a, and the mask transparent areas 253a must be sufficient to accommodate the size or f-number of each of the plano-spherical lenses which along with the dimensions of the mask transparent areas are selected to produce object beams OB having an angular spread that corresponds to the central angular region as defined by MVSS 108. In particular, since the diffusion screen 252 is displaced from the plano-convex spherical lenses by the focal length of such lenses, each lens collimates the output of each point on the portion of the diffusion screen uncovered by a corresponding mask transparent area 254a, and thus the size of the mask and the f-number of the lenses, which can be further controlled by masking, determine the angular spread of the object beams OB. The distance between the holographic recording film and the plano-convex lenses is selected such that each of the mask transparent areas 253a is completely filled with light from a corresponding plano-convex lens, and overlap of the outputs of the plano-convex lenses at the uncovered areas of the holographic recording layer is avoided.

As more particularly shown in FIG. 14, a holographic recording assembly 60 is disposed beneath an exposure mask assembly 50, in substantially the same manner as in FIG. 7. The holographic recording assembly 60 is comprised of a glass substrate 63, a holographic recording layer 61 disposed on the glass substrate 63, and a thin cover layer 65 disposed over the holographic recording layer 61.

In accordance with conventional techniques, a light absorbing layer would be positioned adjacent the bottom of the glass substrate 63 and index matched thereto by a layer of index matching fluid. The exposure mask assembly 50 is comprised of the mask 51 and a mask supporting substrate 55. The hologram recording assembly 60 and the exposure mask assembly 50 are oriented with the exposure mask 51 and the thin cover layer 65 facing each other and separated by a very thin layer of index matching fluid 57.

By way of illustrative example, the holographic recording assembly 60 is movable, for example by a computer driven motor, such that areas that correspond to the cells of the CHMSL hologram can be selectively positioned beneath the mask transparent areas 51a. In order to limit illumination to the cells uncovered by the mask transparent areas, the mask and the mask substrate are secured in the opening of an opaque top cover of a conventional oil gate trough 69, wherein the top cover is sufficiently large to ensure that only the portions of the hologram recording layer beneath the mask transparent areas 51a will be exposed to construction illumination for all exposure positions of the hologram recording layer.

The reference beams for exposure comprise portions of a collimated beam CB2, whose angle is based on an illustrative example of a CHMSL that is illuminated from below as illustrated in FIG. 1. The top of the CHMSL hologram corresponds to the left edge of the hologram recording layer that is perpendicular to the plane of the figure.

By way of illustrative example, the cell rows of a diffuse narrow angle hologram made pursuant to the exposure set up of FIG. 14 are exposed in an indexed manner as described above with respect to the exposure set up of FIG. 7.

In the foregoing procedure wherein the hologram recording layer is moved relative to the mask, the object beam forming lenses are stationary, and the reference beams comprise stationary collimated beams, each cell is exposed with substantially the same reference beam incidence angle where such reference beam angle is formed between the plane of the cell and a line that passes through the center of the cell and is parallel to the central axis of the collimated beam CB2. To the extent that a non-collimated reference beam shape is utilized, the reference beam angle would be the same for all cells but the playback beam angle for a corresponding non-collimated playback beam shape will not be the same for all cells, which will result in reduced brightness if constructed with respective reference beams having substantially the same incidence angle. In order to more accurately emulate the playback source, the reference beam incidence angle can be changed for each row of cells such that the reference beam incidence angle for each cell more closely approximates the playback incidence angle intended for that cell, for example as disclosed in commonly assigned copending application U.S. Ser. No. 07/995,117, filed Dec. 22, 1992, by Smith et al., entitled "MODIFIED TECHNIQUE FOR FABRICATING LOW NOISE FLOODLIT CHMSL HOLOGRAMS", incorporated herein by reference.

Figure 18:
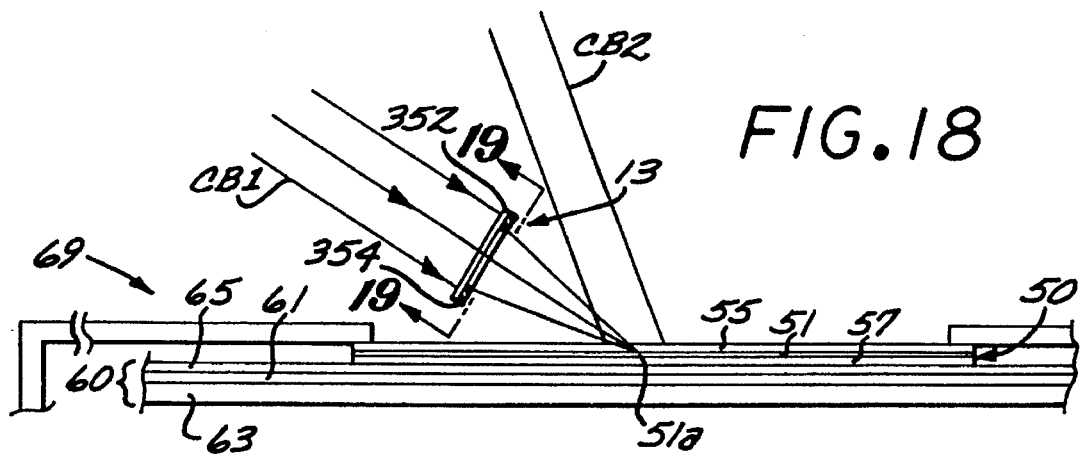
FIG. 18 sets forth by way of illustrative example an exposure system for constructing a wide angle hologram in accordance with the invention that produces diffuse images.
Figure 19:
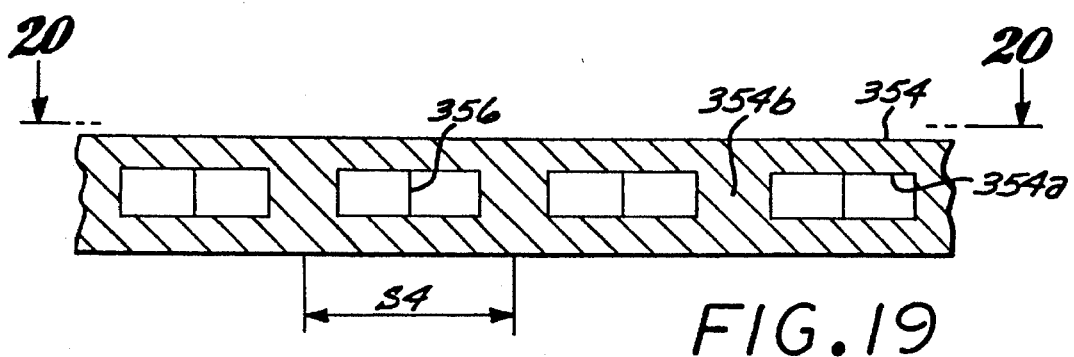
FIG. 19 is an elevational view of a mask and baffles utilized in the exposure system of FIG. 18.
Figure 20:
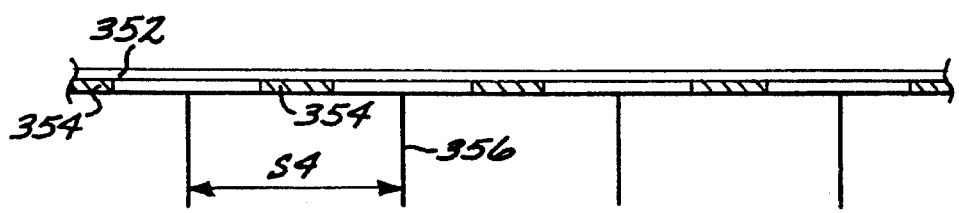
FIG. 20 is a plan view of the mask and baffles of utilized in the exposure system of FIG. 19.

Referring now to FIG. 18, set forth therein by way of illustrative example is an exposure set up for recording diffuse wide angle hologram cells of a diffuse wide angle hologram by a sequence of exposures wherein each exposure exposes a plurality of uniformly spaced non-contiguous cells in a row. The exposure system of FIG. 18 is similar to the exposure system of FIG. 14, and like elements therein are designated with like reference numerals. The differences in the exposure system include a lambertian screen 352 which is illuminated with a collimated beam CB1 and whose output is masked by a film type mask 354 and baffles 356 which are further illustrated in FIG. 19 as viewed from the output side of the mask and in FIG. 20 as viewed from above the mask 354 and baffles 356. The mask 354 is opaque except for a horizontal linear array of mask transparent areas 354a which are separated by opaque areas 354b having a center to center spacing of S4, which is equal to an integral number of adjacent cells to be formed in the holographic recording layer being exposed, and the baffles 356 are centered on the mask transparent areas 354a in alignment with the optical axis of the collimated beam CB1. For ease of illustration, the masked outputs of the lambertian screen 352 are depicted by a representative centerline.

Figure 21:
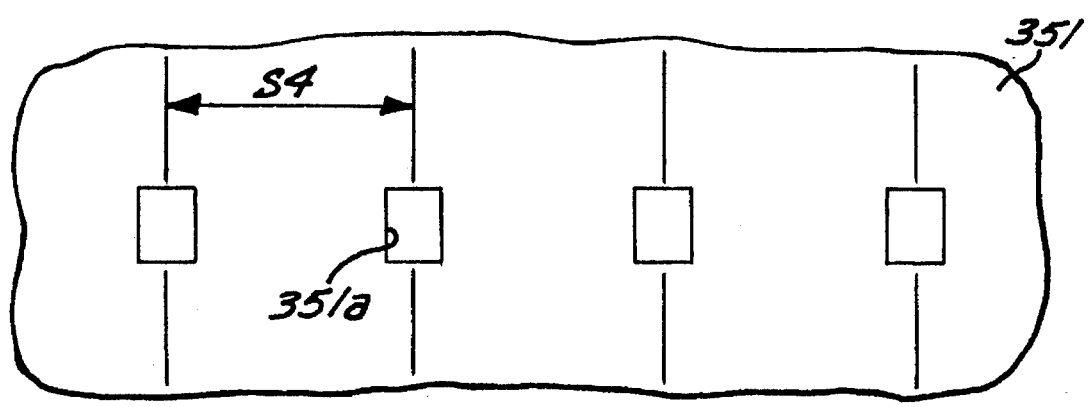
FIG. 21 a mask that is utilized to define hologram cells in the exposure set up of FIG. 18.

The exposure set up of FIG. 18 further employs a film type mask 351, schematically depicted in FIG. 21, that is opaque except for uniformly spaced mask transparent areas 351a of the same size as each of the cells of the wide angle hologram and aligned with the opaque areas 354b of the mask 354 so as to have the same center-to-center spacing S4 as the opaque areas 354b. The number of mask transparent areas 351a is the same as the number of opaque areas 154b. The mask 354 and the baffles 356 cooperate to produce object beams that respectively illuminate the mask transparent areas 351a that are adjacent the holographic recording layer. Each object beam effectively comprises a beam that spreads horizontally and vertically on either side of a central shadow region. The angular spread of each object beam is controlled by the center to center horizontal spacing between the mask transparent areas 354a of the mask 354, the height of the mask transparent areas 154a, and the distance of the mask 354 and lambertian screen from the mask transparent areas 351a adjacent the holographic recording layer; while the angular extent of the shadow region is controlled by the width of the intervening opaque areas 354b of the mask 354 and the distance of the mask 154 and lambertian screen. The angular field of each object beam is particularly controlled to correspond to the two horizontal regions on either side of the central solid angular region such that the combination of both holograms meets the horizontal wide angle requirement.

By way of illustrative example, the cell rows of a diffuse wide angle hologram made pursuant to the exposure system of FIG. 18 are exposed in an indexed manner as described above with respect to the exposure set up of FIG. 7.

Further in accordance with the invention, the holograms 31, 32 of the holographic center high mounted stoplight of FIG. 1 can comprise hologram copies made from a narrow angle hologram master made with one of the exposure systems of FIGS. 7 and 14, and a wide angle hologram master made with one of the exposure systems of FIGS. 10 and 18, respectively. The narrow angle hologram master and the wide angle hologram master can be copied separately to make separate copies of each, or they can be laminated together and copied to make a composite hologram. In either case, the efficiencies of the narrow angle hologram master and the wide angle hologram master need to the selected such that the hologram copies provide the desired efficiencies.

Figure 22:
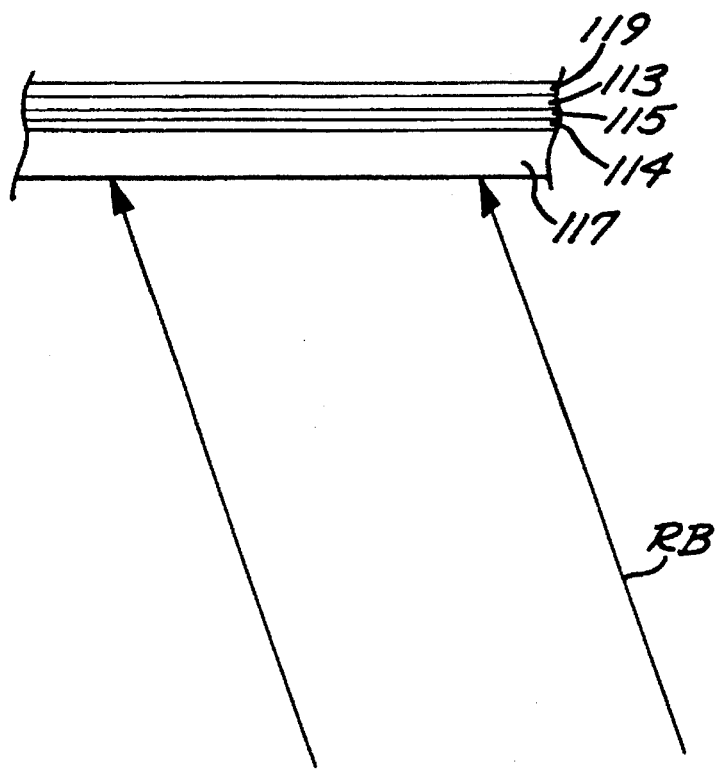
FIG. 22 forth by way of illustrative example a copy system for making hologram copies of hologram masters made pursuant to the exposure systems of FIG. 7, FIG. 10, FIG. 14, and FIG. 18.

Referring in particular to FIG. 22, schematically depicted therein is a copy system for making hologram copies from hologram masters made pursuant to the above described exposure systems. The copy system includes a master hologram 114, an adjacent holographic recording layer 113 that is located at a minimum distance from the master hologram, and an intervening thin layer of index matching fluid 115. The master hologram is supported by a glass substrate 117, while the holographic recording layer 113 is supported by an opaque backing layer 119. In use, a copy reference beam RB that emulates the reference beam utilized to construct the master hologram 114 is directed to the glass substrate at an angle that produces the proper beam angle for reconstruction of the hologram master 114. The copy reference beam passes through the glass substrate 117, and is partially diffracted by the master hologram 114. The diffracted and undiffracted light from the master hologram interfere in the holographic recording layer to make the hologram copy.

For maximum efficiency for a narrow angle hologram copy, the narrow angle hologram utilized as the narrow angle hologram master should have an efficiency of 50% so as to provide a 1 to 1 beam ratio for the example of a DuPont HRF 600 photopolymer holographic recording layer. For a wide angle hologram copy having an efficiency in the range of about 30% to 40%, for the implementation wherein the wide angle hologram is closest to the reconstruction source 30, the wide angle hologram utilized as the wide angle hologram master should have an efficiency in the range of about 10% to 20% for the example of a DuPont HRF 600 photopolymer holographic recording layer. For a wide angle hologram copy having an efficiency of at least 90%, for the implementation wherein the narrow angle hologram is closest to the reconstruction source 30, the wide angle hologram utilized as the wide angle hologram master should have an efficiency in the range of about 50% for the example of a DuPont HRF 600 photopolymer holographic recording layer.

As discussed previously, the narrow angle hologram master and the wide angle hologram master can be copied separately to make separate copies of each, or they can be laminated together and copied to make a composite hologram copy that would be utilized in place of the first and second holograms 31, 32. The copy system of FIG. 20 can be utilized to produce a composite hologram copy by utilizing a laminate of a narrow angle hologram master and a wide angle hologram master as the hologram master 111. In the resulting copy hologram the wide angle holograms cells and the narrow angle hologram cells are superimposed.

In making a composite copy, the relative efficiencies of the narrow angle and wide angle hologram masters must be properly selected since light diffracted light from one hologram master can interfere with diffracted light from the other hologram master to produce cross-modulation noise holograms in implementations wherein narrow angle hologram cells and wide angle hologram cells are superimposed. This problem can be alleviated by reducing the diffracted outputs of both hologram masters that comprise object beams in the construction of the composite hologram copy. For example, a narrow angle hologram master efficiency of about 25% and a wide angle hologram master efficiency of about 5% for a DuPont HRF 600 photopolymer holographic recording layer sufficiently reduces the cross-modulation noise holograms while minimizing loss in the efficiencies of the desired diffraction directions of the copy. In implementations wherein each hologram master comprises a pattern of hologram and non-hologram cells, and wherein the hologram cell and non-hologram cell pattern of the narrow angle hologram is the negative of the hologram cell and non-hologram cell pattern of the wide angle hologram, there will be substantially no cross-modulation noise holograms, and each of the hologram masters can have an efficiency of about 50%.

In the above described copy procedures, each of the master holograms contained the desired pattern of hologram and non-hologram cells. As an alternative procedure for the copy process wherein separate narrow angle and wide angle hologram copies are made from separate hologram masters, a copy hologram can be made by pre-exposing a holographic recording layer to define the desired non-hologram cells and then copying the appropriate hologram master thereto wherein all of the cells of the hologram master are hologram cells. In this manner, since the non-hologram cells were defined by desensitizing pre-exposure, holograms will be formed only in those areas of the holographic recording layer in which hologram cells are intended to be formed.

While the hologram assembly of the invention has been described in the foregoing in the context of specular image holograms that provide orthoscopic images for purposes of illustrative example, the invention also contemplates specular image holograms that provide pseudoscopic images. For example, the specular image hologram of the holograms 31, 32 of the hologram assembly can be rotated 180 degrees about a horizontal axis such that the original top of the specular hologram is at the bottom and the hologram surface that was originally toward the inside of the vehicle is now toward the outside of the vehicle. Each of the cells of a specular image hologram rotated in such manner would produce an image of a point source or a line source that is located behind the hologram (i.e., towards the rear of the vehicle), with the horizontal and vertical spread being determined as if a converging beam were masked by the boundaries of the cell.

In accordance with a further aspect of the invention, a single narrow angle hologram can be utilized for the hologram assembly of the holographic center high mounted stoplight of FIG. 1, in which case the coverage for the peripheral regions would be provided by scattered illumination.

In accordance with yet another aspect of the invention, one or both of the first and second holograms can comprise all hologram cells, which can be achieved by omitting the step of desensitizing pre-exposure in the construction of the hologram that is to contain all hologram cells.

The foregoing has been a disclosure of a holographic center high mounted stoplight that meets governmentally required luminous intensity and angular coverage requirements while minimizing the power required. The hologram structure of the holographic center high mounted stoplight of the invention can be configured to produce a lenticulated appearance similar to that of conventional stoplights, and is amenable to efficient production by separate copying of respective hologram layers to respective hologram copy layers, or by copying of a plurality of hologram layers to a single layer hologram copy.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic center high mounted stoplight system for a vehicle, comprising:

a light source for providing a reconstruction beam;

a first array of non-overlapping bright transmission hologram cells and dim transmission hologram cells, each transmission hologram cell producing a specular image viewable in a first predetermined angular field that extends rearwardly relative to the vehicle pursuant to diffraction of a portion of said reconstruction beam, said first array of cells arranged in a first predetermined pattern so as to produce a pattern of bright and dim areas; and a second array of non-overlapping bright transmission hologram cells and dim transmission hologram cells, each transmission hologram cell producing diffuse image viewable in a second predetermined angular field that extends rearwardly relative to the vehicle pursuant to diffraction of a portion of said reconstruction beam, said second array of cells arranged in a second predetermined pattern so as to produce a pattern of bright and dim areas;

whereby said specular and diffuse images produced by said first and second holograms form stoplight illumination.

2. The holographic center high mounted stoplight system of claim 1 wherein said first array of bright transmission hologram cells and dim transmission hologram cells is formed in a first hologram layer, and wherein said second array of bright transmission hologram cells and dim transmission hologram cells is formed in a second hologram layer, said first and second hologram layers being laminarly attached to each other.

3. The holographic center high mounted stoplight system of claim 1 wherein said first array of bright transmission hologram cells and dim transmission hologram cells and said second array of bright transmission hologram cells and dim transmission hologram cells are formed in a single hologram layer.

4. The holographic center high mounted stoplight system of claim 1 wherein said first predetermined angular field comprises a central angular region having vertical and horizontal extent, and wherein said second predetermined angular field includes first and second peripheral angular regions that are horizontally on either side of said central angular region.

5. The holographic center high mounted stoplight system of claim 4 wherein each of said transmission hologram cells of said first array produces an image of a masked point source.

6. The holographic high mounted stoplight system of claim 1 wherein said second predetermined angular field comprises a central angular region having vertical and horizontal extent, and wherein said first predetermined angular field includes first and second peripheral angular regions that are horizontally on either side of said central angular region.

7. The holographic high mounted stoplight system of claim 6 wherein each of said transmission hologram cells of said first array produces an image of a masked line source.

8. The holographic high mounted stoplight system of claim 1 wherein said bright transmission hologram and dim transmission hologram cells of said first array and said bright transmission hologram and dim transmission hologram cells of said second array are substantially identical in shape, and wherein said first predetermined pattern is a negative of said second predetermined pattern whereby the bright areas and dim areas produced by said first array respectively correspond to the dim areas and bright areas produced by said second array.

9. A holographic center high mounted stoplight system for a vehicle, comprising:

a light source for providing a reconstruction beam;

a first array of non-overlapping bright transmission hologram cells and dim transmission hologram cells, each transmission hologram cell producing a specular image viewable in a first predetermined angular field that extends rearwardly relative to the vehicle pursuant to diffraction of a portion of said reconstruction beam, said first array of cells arranged in a first predetermined pattern so as to produce a pattern of bright and dim areas; and a second array of non-overlapping bright transmission hologram cells and non-hologram cells, each transmission hologram cell producing diffuse image viewable in a second predetermined angular field that extends rearwardly relative to the vehicle pursuant to diffraction of a portion of said reconstruction beam, said second array of cells arranged in a second predetermined pattern so as to produce a pattern of bright and dark areas;

whereby said specular and diffuse images produced by said first and second holograms form stoplight illumination.

10. The holographic center high mounted stoplight system of claim 9 wherein said first array of bright transmission hologram cells and dim transmission hologram cells is formed in a first hologram layer, and wherein said second array of bright transmission hologram cells and non-hologram cells is formed in a second hologram layer, said first and second hologram layers being laminarly attached to each other.

11. The holographic center high mounted stoplight system of claim 9 wherein said first array of bright transmission hologram cells and dim transmission hologram cells and said second array of bright transmission hologram cells and non-hologram cells are formed in a single hologram layer.

12. The holographic center high mounted stoplight system of claim 9 wherein said first predetermined angular field comprises a central angular region having vertical and horizontal extent, and wherein said second predetermined angular field includes first and second peripheral angular regions that are horizontally on either side of said central angular region.

13. The holographic center high mounted stoplight system of claim 12 wherein each of said transmission hologram cells of said first array produces an image of a masked point source.

14. The holographic high mounted stoplight system of claim 9 wherein said second predetermined angular field comprises a central angular region having vertical and horizontal extent, and wherein said first predetermined angular field includes first and second peripheral angular regions that are horizontally on either side of said central angular region.

15. The holographic high mounted stoplight system of claim 14 wherein each of said transmission hologram cells of said first array produces an image of a masked line source.

16. The holographic high mounted stoplight system of claim 9 wherein said bright transmission hologram and dim transmission hologram cells of said first array and said bright transmission hologram and non-hologram cells of said second array are substantially identical in shape, and wherein said first predetermined pattern is a negative of said second predetermined pattern whereby the bright areas and dim areas produced by said first array respectively correspond to the dark areas and bright areas produced by said second array.

17. A holographic center high mounted stoplight system for a vehicle, comprising:

a light source for providing a reconstruction beam;

a first array of non-overlapping bright transmission hologram cells and non-hologram cells, each transmission hologram cell producing a specular image viewable in a first predetermined angular field that extends rearwardly relative to the vehicle pursuant to diffraction of a portion of said reconstruction beam, said first array of cells arranged in a first predetermined pattern so as to produce a pattern of bright and dark areas; and a second array of non-overlapping bright transmission hologram cells and dim transmission hologram cells, each transmission hologram cell producing diffuse image viewable in a second predetermined angular field that extends rearwardly relative to the vehicle pursuant to diffraction of a portion of said reconstruction beam, said second array of cells arranged in a second predetermined pattern so as to produce a pattern of bright and dim areas;

whereby said secular and diffuse images produced by said first and second holograms form stoplight illumination.

18. The holographic center high mounted stoplight system of claim 17 wherein said first array of bright transmission hologram cells and non-hologram cells is formed in a first hologram layer, and wherein said second array of bright transmission hologram cells and dim hologram cells is formed in a second hologram layer, said first and second hologram layers being laminarly attached to each other.

19. The holographic center high mounted stoplight system of claim 17 wherein said first array of bright transmission hologram cells and non-hologram cells and said second array of bright transmission hologram cells and dim hologram cells are formed in a single hologram layer.

20. The holographic center high mounted stoplight system of claim 17 wherein said first predetermined angular field comprises a central angular region having vertical and horizontal extent, and wherein said second predetermined angular field includes first and second peripheral angular regions that are horizontally on either side of said central angular region.

21. The holographic center high mounted stoplight system of claim 20 wherein each of said transmission hologram cells of said first array produces an image of a masked point source.

22. The holographic high mounted stoplight system of claim 17 wherein said second predetermined angular field comprises a central angular region having vertical and horizontal extent, and wherein said first predetermined angular field includes first and second peripheral angular regions that are horizontally on either side of said central angular region.

23. The holographic high mounted stoplight system of claim 22 wherein each of said transmission hologram cells of said first array produces an image of a masked line source.

24. The holographic high mounted stoplight system of claim 17 wherein said bright transmission hologram and non-hologram cells of said first array and said bright transmission hologram and dim hologram cells of said second array are substantially identical in shape, and wherein said first predetermined pattern is a negative of said second predetermined pattern whereby the bright areas and dark areas produced by said first array respectively correspond to the dim areas and bright areas produced by said second array.

25. A holographic center high mounted stoplight system for a vehicle, comprising:

a light source for providing a reconstruction beam;

a first array of non-overlapping transmission hologram cells and non-hologram cells, each transmission hologram cell producing a specular image viewable in a first predetermined angular field that extends rearwardly relative to the vehicle pursuant to diffraction of a portion of said reconstruction beam, said first array of cells arranged in a first predetermined pattern so as to produce a pattern of light and dark areas, and said first predetermined angular field comprising a central angular region having vertical and horizontal extent; and a second array of non-overlapping transmission hologram cells and non-hologram cells, each transmission hologram cell producing a diffuse image viewable in a second predetermined angular field that extends rearwardly relative to the vehicle pursuant to diffraction of a portion of said reconstruction beam, said second array of cells arranged in a second predetermined pattern so as to produce a pattern of light and dark areas, and second predetermined angular field comprising first and second peripheral angular regions that are horizontally on either side of said central angular region;

whereby said specular images and diffuse images produced by said first and second arrays form stoplight illumination.

26. The holographic center high mounted stoplight system of claim 25 wherein each of said transmission hologram cells of said first array produces an image of a masked point source.

27. The holographic center high mounted stoplight system of claim 25 wherein said first array of transmission hologram and non-hologram cells is formed in a first hologram layer, and wherein said second array of transmission hologram and non-hologram cells is formed in a second hologram layer, said first and second hologram layers being laminarly attached to each other.

28. The holographic center high mounted stoplight system of claim 25 wherein said first array of transmission hologram and non-hologram cells and said second array of transmission hologram and non-hologram cells are formed in a single hologram layer.

29. The holographic high mounted stoplight system of claim 25 wherein said transmission hologram and non-hologram cells of said first array and said transmission hologram and non-hologram cells of said second array are substantially identical in shape, and wherein said first predetermined pattern is a negative of said second predetermined pattern whereby the light areas and areas produced by said first array respectively correspond to the dark areas and light areas produced by said second array.

30. A holographic center high mounted stoplight system for a vehicle, comprising:

a light source for providing a reconstruction beam;

a first array of non-overlapping transmission hologram cells and non-hologram cells, each transmission hologram cell producing a diffuse image viewable in a first predetermined angular field that extends rearwardly relative to the vehicle pursuant to diffraction of a portion of said reconstruction beam, said first array of cells arranged in a first predetermined pattern so as to produce a pattern of light and dark areas, and said first predetermined angular field comprising a central angular region having vertical and horizontal extent; and a second array of non-overlapping transmission hologram cells and non-hologram cells, each transmission hologram cell producing a specular image viewable in a second predetermined angular field that extends rearwardly relative to the vehicle pursuant to diffraction of a portion of said reconstruction beam, said second array of cells arranged in a second predetermined pattern so as to produce a pattern of light and dark areas, and second predetermined angular field comprising first and second peripheral angular regions that are horizontally on either side of said central angular region;

whereby said diffuse images and specular images produced by said first and second holograms form stoplight illumination.

31. The holographic center high mounted stoplight system of claim 30 wherein each of said transmission hologram cells of said second array produces an image of a masked line source.

32. The holographic center high mounted stoplight system of claim 30 wherein said first array of transmission hologram and non-hologram cells is formed in a first hologram layer, and wherein said second array of transmission hologram and non-hologram cells is formed in a second hologram layer, said first and second hologram layers being laminarly attached to each other.

33. The holographic center high mounted stoplight system of claim 30 wherein said first array of transmission hologram and non-hologram cells and said second array of transmission hologram and non-hologram cells are formed in a single hologram layer.

34. The holographic high mounted stoplight system of claim 30 wherein said transmission hologram and non-hologram cells of said first array and said transmission hologram and non-hologram cells of said second array are substantially identical in shape, and wherein said first predetermined pattern is a negative of said second predetermined pattern whereby the light areas and areas produced by said first array respectively correspond to the dark areas and light areas produced by said second array.

* * * * *